C. A. ELY.
BALL BEARING HINGE.
APPLICATION FILED JULY 29, 1915.
1,156,765.
Patented Oct. 12, 1915.
2 SHEETS—SHEET 1.
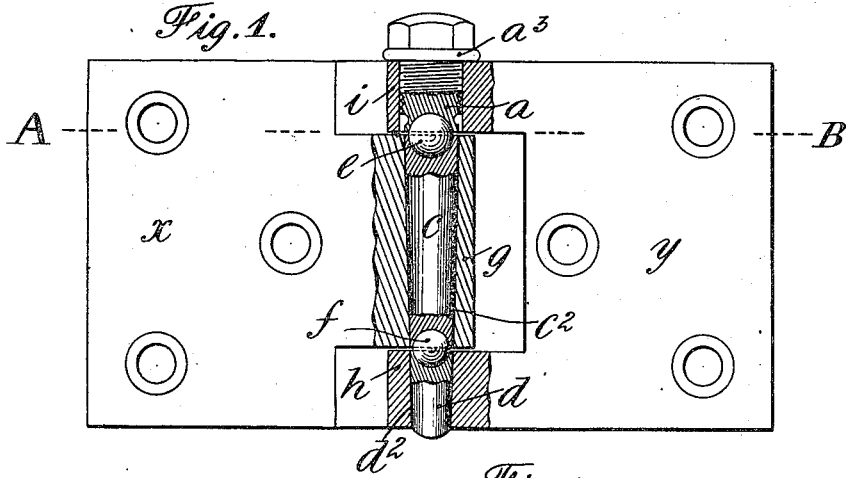
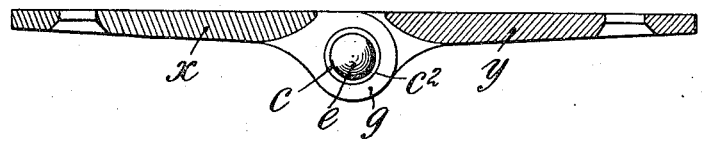
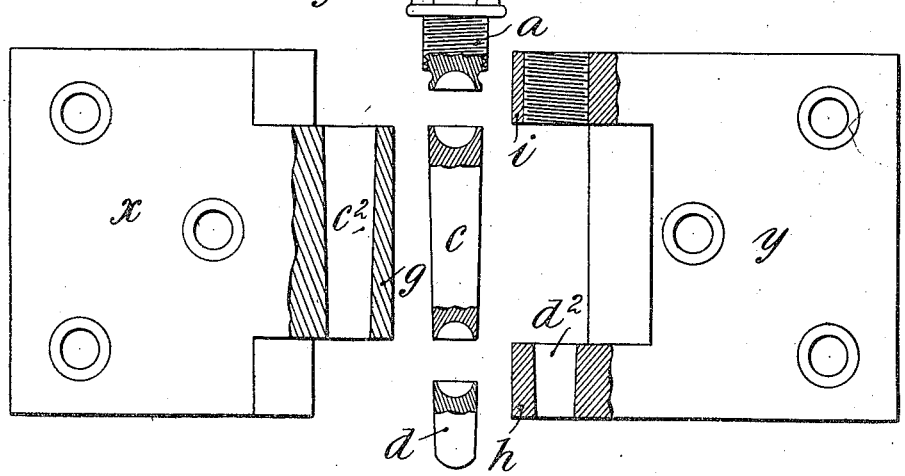
Witnesses
Inventor
Clement A. Ely
by James L. Norris, Attorney

C. A. ELY.
BALL BEARING HINGE.
APPLICATION FILED JULY 29, 1915.

1,156,765.

Patented Oct. 12, 1915.
2 SHEETS—SHEET 2.

UNITED STATES PATENT OFFICE.

CLEMENT ANDERSON ELY, OF WOLVERHAMPTON, ENGLAND.

BALL-BEARING HINGE.

1,156,765.   Specification of Letters Patent.   Patented Oct. 12, 1915.

Application filed July 29, 1915. Serial No. 42,653.

*To all whom it may concern:*

Be it known that I, CLEMENT ANDERSON ELY, subject of the King of Great Britain, residing at "Seaton," Albert Road, Wolverhampton, in the county of Staffordshire, England, works manager, have invented certain new and useful Improvements in Ball-Bearing Hinges, of which the following is a specification.

The invention provides a ball bearing arrangement in a hinge having three or more knuckles. The hinge pin is formed of three or more pieces applied axially in line a piece to the hole in each knuckle, and a ball is axially arranged to work between the opposing ends of each two pieces, which ends are ball cupped or formed with seats to receive the balls. The pintle section, aforesaid, may be fitted to the knuckles in a detachable manner, in which case they, or most of them, are taper pieces to fit correspondingly taper holes in the knuckles, said sections being forced home, to prevent their rotation except with the knuckles, and together with the balls held in position, by a screw plug, or other device, applied to one of the knuckles of the hinge, the removal of this locking device allowing of the removal of the entire hinge pin.

One form of the invention fixes the pintle sections within the knuckles by displacement of the metal of said sections by end pressure with the balls between said sections, this displacement also forming cup seatings for the balls. This arrangement provides a permanently fixed hinge pin without the use of any locking device, and also provides a cheaper form of hinge pivoting by balls.

The improvements hereinbefore stated and hereinafter clearly defined by the claims are represented carried into practical effect by three arrangements in the accompanying drawings.

Figure 4:
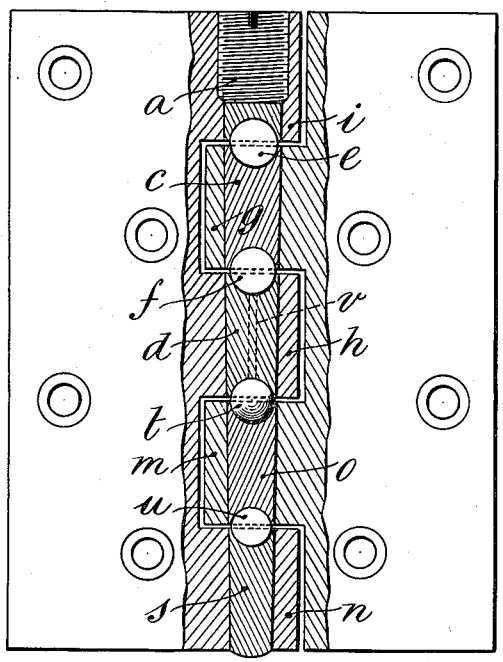
Figure 5:
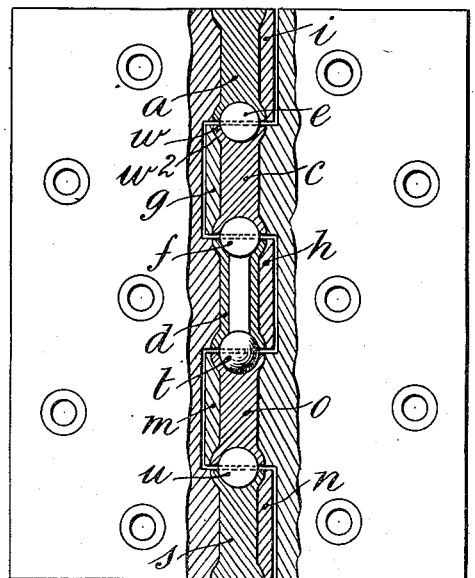

Figure 1 shows a three knuckle hinge in elevation with the pivot in section with a detachable form of hinge pin. Fig. 2 is a section of Fig. 1 on the dotted line A B. Fig. 3 shows the hinge parts Fig. 1 separated less the steel balls. Fig. 4 shows a similar elevation as Fig. 1 of a five-knuckle hinge with a detachable hinge pin. Fig. 5 is a sectional elevation similar to Fig. 4 of a five-knuckle hinge with the pintle sections permanently fixed to the knuckles by displacement of metal which also forms the cup seatings for the balls.

With reference to Figs. 1 to 3, the hinge pin is formed of three sections $a$, $c$, and $d$, and two balls $e$ and $f$. The sections $c$ and $d$ taper, and fit respectively, in correspondingly tapered holes $c^2$ $d^2$ in the knuckles $g$ and $h$, while the section $a$ is a screw-threaded plug in a correspondingly threaded hole in the knuckle $i$ to form a setting up and locking device for all of the sections of the pin. The three sections and the balls are applied axially in line, and their adjacent ends are formed with cup seatings for said balls. The balls work in said seatings between the opposed ends of the sections and separate said sections and the knuckles apart to provide the necessary working clearance. The head of the section $a$ may be provided with a locking spring washer $a^x$. The taper sections fit the tapered holes in the knuckles with sufficient friction to prevent said sections from rotating independently of the particular knuckles they engage. In this form of the invention the two parts $x$ and $y$ of the hinge may be detached by removing the pintle section $a$ and knocking out the pintle sections $c$ and $d$ together with the balls $e$ and $f$ from their positions within and in respect of the knuckles, so that it is not necessary to detach either hinge part $x$ or $y$ from the door or door frame to remove the door from the frame.

If the hinge is used in the manner shown in the drawings, namely, with the pintle section $a$ uppermost the part $y$ is attached to the door, and the part $x$ to the frame, as thereby the hanging of the door assists the locking of the pintle sections, whereas if the hinge is used with the pintle section $a$ lowermost, the part $x$ is attached to the door and the part $y$ to the door frame.

It is obvious that the section $a$ may be also a taper or non screw-threaded part fitting the knuckle $i$ with a screw plug applied to said knuckle at the back of it.

The arrangement of the invention Fig. 4 is substantially in accordance with the arrangement Figs. 1 to 3, except that there are five knuckles, and five pintle sections to form the taper hinge pin, and four balls operative between said sections; it being always understood that there is a pintle section for each and every knuckle in the hinge. The knuckles are shown at $i$, $g$, $h$, $m$, and $n$, the pintle sections at $a$, $c$, $d$, $o$, and $s$, and the balls at $e$, $f$, $t$, and $u$. The pintle sections are held within the knuckles by friction, but by grooving the holes in the knuckles and providing the pintle sections with ribs to enter said grooves, the pintle sections could be positively secured against rotation in the knuckles, and still be removable therefrom. The dotted lines v in Fig. 4 indicate how oil passages may be formed in the pintle sections to communicate between the ball seatings.

Fig. 5 shows the application of the invention to a cheaper form of hinge, the pintle of which is not detachable, as in Figs. 1 to 4, but permanently fixed within the knuckles. In this arrangement each hinge pintle section is formed and fixed within its knuckle by expanding the metal of said section in the hole of the knuckle by applying pressure at the ends of the section, which pressure at the same time forms the ball seatings, preferably by the help of the balls themselves as formers for said seatings. The knuckles are at $i$, $g$, $h$, $m$, and $n$, the hinge pintle sections at $a$, $c$, $d$, $o$ and $s$, and the four intervening balls at $e$, $f$, $t$, and $u$. In manufacturing this hinge, sections of rod or tube of the correct length, with balls between their adjacent ends are inserted into the knuckles, and then from the two ends of the outer sections pressure is applied to expand the end of each section, at $w$, into a countersinking $w^2$, of the knuckle, and at the same time form the seats for the balls, the displacement of the section when a tube, as at $d$, being quite easy, and when a solid rod length, as at $a$, $c$, $o$ or $n$, by previously machining a cavity in the end of the pintle section, which cavity is then only enlarged by the pressure of the ball against the end of said section. The length of the sections must be accurately calculated so that there is not a surplus of metal to prevent the necessary working clearance between the knuckles when the section is expanded, it being preferable to employ too little of the metal rather than too much. The balls must be of a size to pass freely through the smaller sized portion of the hole in each knuckle. The expansion of the metal of the sections $a$ and $s$ at the outer ends is not absolutely necessary, but advisable. In this form of hinge the pivoting parts may be made of superior metal, and the body parts and knuckles may be made of ordinary cast or wrought iron, or of inferior metal.

Instead of expanding all of the pintle sections into the knuckles and shaping them by one pressure operation while the knuckles are in alinement and the balls all in position, some of said sections may be expanded into the knuckles prior to others, for example, the middle pintle $d$ may be fixed in its knuckle $h$ and the ball seatings formed within its ends prior to any engagement of the knuckles with each other, and then after the knuckles the pintle sections $c$ and $o$ may be expanded with the balls between them and the pintle section $d$ by the use of tools applied to the holes in the end knuckles before the end knuckles are fitted with pintle sections, so that the final end pressure on the terminal pintle sections $a$ and $s$ need only be sufficient to expand these particular pintle sections and form therein the necessary ball seatings.

The pintle sections aforesaid are of circular cross section, but it is obvious that same may be of an angular cross section with the holes in the knuckles of corresponding shape, particularly in the case of the arrangement Fig. 5; the circular cross section being most efficient in the case of Figs. 1 to 4 in consequence of the taper of the full length hinge pin hole.

Having now described my invention what I claim and desire to secure by Letters Patent is:—

1. A ball bearing hinge comprising the leaf $x$ formed with one or more knuckles, the leaf $y$ formed with two or more knuckles to co-act with the knuckle or knuckles on the part $y$, each knuckle having an axial hole, a pintle section for each of said holes, each pintle section having a ball seat in both of its ends, and balls arranged in said seats to connect the pin pieces axially in line in an anti-frictional manner, substantially as described.

2. A ball bearing hinge comprising the leaf $x$ formed with one or more knuckles, the leaf $y$ formed with two or more knuckles to co-act with the knuckle or knuckles on the part $y$, some of said knuckles having tapered pintle holes, tapered pintle sections arranged in said holes, a screw plug adjustably engaging a hole in another of the knuckles, the opposing ends of the pintle sections having ball seats, and balls applied to the seats to connect the pintle sections axially in line in an antifrictional manner, substantially as described.

3. A ball bearing hinge comprising the leaf $x$ formed with one or more knuckles, the leaf $y$ formed with two or more knuckles to co-act with the knuckle or knuckles on the part $y$, each of said knuckles having an axial hole, a pintle section arranged in each of said holes and having its ends expanded and provided with ball seats, and balls arranged in said seats to connect the pintle sections axially in line in an anti-frictional manner, substantially as described.

In testimony whereof I have hereunto set my hand in presence of two subscribing witnesses.

CLEMENT ANDERSON ELY.

Witnesses:
A. W. FUERY,
D. LEAKER.